April 14, 1942.   M. PARTIOT   2,279,378
HYDRAULIC CONTROL SYSTEM
Filed June 11, 1938
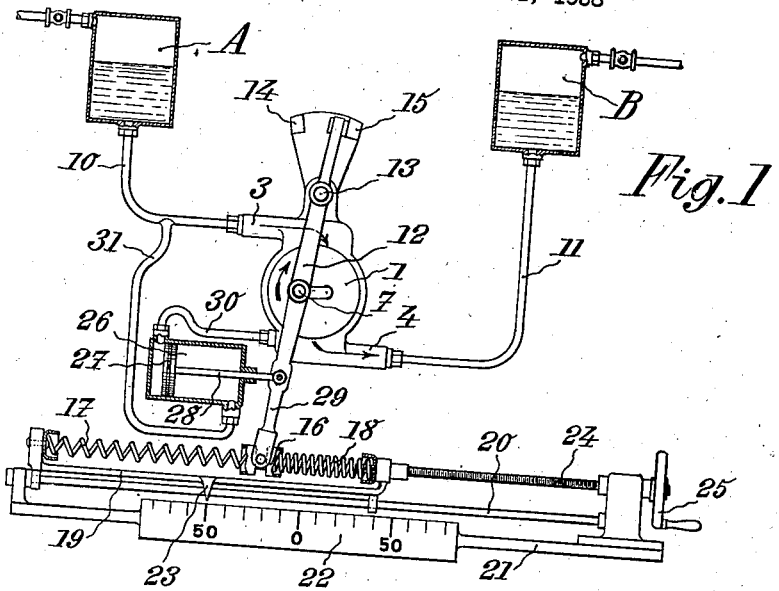
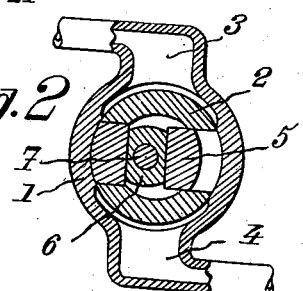
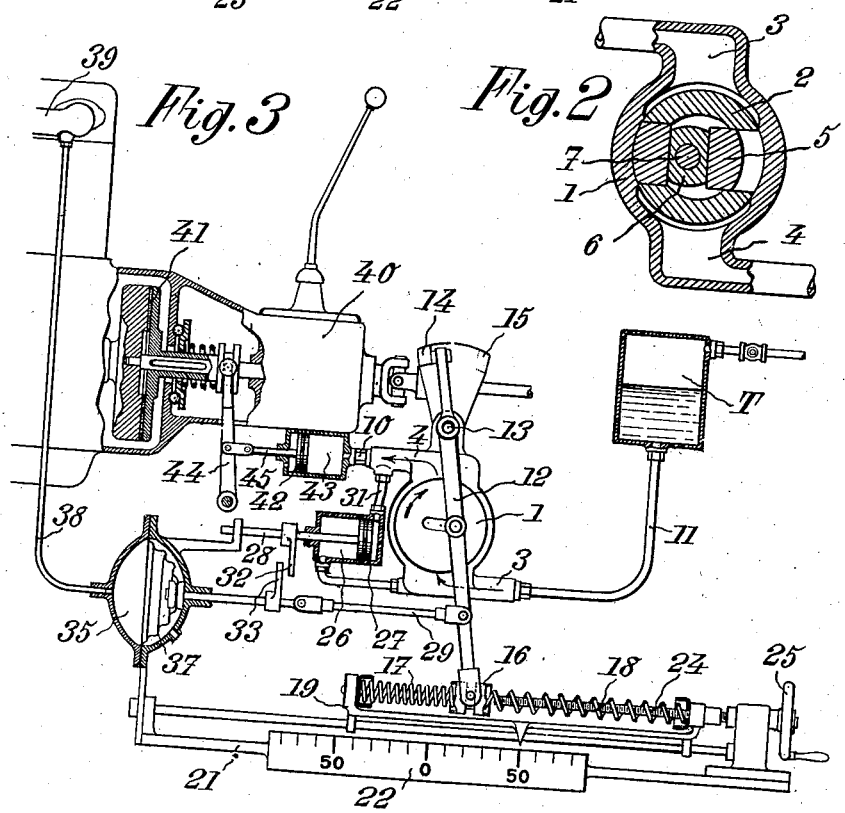
Inventor:
M. Partiot Patented Apr. 14, 1942

2,279,378

UNITED STATES PATENT OFFICE 2,279,378

HYDRAULIC CONTROL SYSTEM

Maurice Partiot, New York, N. Y.

Application June 11, 1938, Serial No. 213,283

6 Claims. (Cl. 103—38)

The present invention relates to hydraulic control systems of the kind including a pump always driven in the same direction and provided with means for varying its flow independently of the speed at which it is driven.

One object of the present invention is to provide a system of this kind which is better adapted to meet the requirements of practice and in particular which is reversible, either automatically or at will.

Another object of the invention is to provide a system of this type adapted to control the clutch of an automobile vehicle.

With these and other objects in view, one feature of my invention consists in fitting a pump of the type above referred to with means, capable of reversing the direction of flow through said pump, for varying the rate of said flow in response to variations of the difference between the pressures of the liquid entering the pump and the liquid leaving it, said means, movable between two extreme positions, being yieldingly applied in one of these positions by manually adjustable means.

Another feature of the invention, relative to the control of the clutch of an automobile vehicle, consists in connecting with said clutch a part operative by the liquid pressure supplied by the pump so that said clutch is let in when the liquid flows in one direction through said pump and is disengaged when the liquid flows in the opposite direction therethrough.

According to still another feature of the invention, relating to the last mentioned case, means operative by the suction of the vehicle engine are provided for acting on said pump, when the speed of the engine drops below a given value, in such manner as to tend to reverse the working of the pump so as to obtain the disengagement of the clutch.

Other features of the present invention will result from the following detailed description of some specific embodiments thereof.

Preferred embodiments of the present invention will be hereinafter described, with reference to the accompanying drawing, given merely by way of example, and in which:

Fig. 1 is a diagrammatic vertical view of a hydraulic control system according to the present invention.

Fig. 2 is a vertical sectional view illustrating, by way of example, the structure of a pump used in connection with the system of Fig. 1;

Fig. 3 is a diagrammatic vertical sectional view of the system according to the invention in combination with an internal combustion engine and a clutch associated with said engine.

The pump shown by way of example by Fig. 2 includes a casing 1 and a rotor 2 rotated therein through any suitable driving means, not visible on the drawing. This casing is provided with chambers or passages 3 and 4, located respectively on opposite sides of the rotor. The surface of the rotor is adapted to slide with a fluid-tight fit against the inner wall of the stator between these chambers. A piston 5 is adapted to reciprocate with respect to the rotor under the influence of a block slidable transversely in a groove of the piston, said block 6 being kept in fixed position with respect to the pump body or casing 1 by means of a pin 7.

Chamber 3 communicates through a pipe 10 with any container, for instance a tank A. On the other hand, chamber 4 communicates through a pipe 11 with a tank B (Fig. 1).

Pin 7 is carried by a lever 12, pivoted at 13 to the pump body. The movement of said lever 12 about its pivot 13 is limited by the provision of abutments 14 and 15, also carried by the pump body.

The lower end of lever 12 is pivoted to a member 16, inserted between two springs 17 and 18 the outer ends of which are fixed to the ends of a support 19, slidable along a rod 20, carried by a frame 21. The position of support 19 along rod 20 is controlled by means of a crank 25 keyed on a threaded rod 24 journalled in frame 21 and screwing in a threaded housing provided in support 19.

Frame 21 is provided with a graduated scale 22 and a pointer 23 carried by movable support 19 is movable along said graduated scale.

The device further includes a piston 27 movable in a cylinder 26 mounted in fixed position with respect to the pump body. In this case, the cylinder is arranged substantially at right angles to the intermediate position of lever 12. The rod 28 of this piston is provided, at its outer end, with a pin engaging in a slot 29 of lever 12, so that any movement of piston 27 inside cylinder 26 tends to produce an angular displacement of lever 12 about its pivot 13.

As shown by the drawing, cylinder 26 is closed at both ends. One end communicates through a pipe 30 with chamber 4 and the other end communicates through a pipe 31 with chamber 3.

The system above described operates in the following manner:

When pin 7 is in the position shown in the drawing, that is to say in eccentric relation to the axis of the pump body on the left hand side thereof, and supposing that the pump rotor is turning in the clockwise direction, piston 5 is caused, under the influence of block 6 cooperating with pin 7, to reciprocate within said rotor, and liquid passes from chamber 3 into chamber 4, that is to say is fed from tank A to tank B.

The position of lever 12, which determines the eccentricity of pin 7, is controlled by means of crank 25, acting through the resilient means constituted by springs 17 and 18.

If, for some reason, the pressure in chamber 4 exceeds a predetermined value, as this pressure is transmitted through pipe 30 to the part of cylinder 26 on the left of piston 27, this piston is moved toward the right, displacing lever 12 against the elastic resistance of spring 18. This reduces the eccentricity of pin 7 and consequently relieves the pressure in chamber 4. Should this pressure still remain too high, the action of piston 27 is pursued and pin 7 can finally be brought into coaxial relation with the pump body. This corresponds to the pump running idle.

Supposing now that, by acting upon crank 25, lever 12 is turned into the opposite position, that is to say that its end 16 is brought on the other side of a vertical line passing through pivot 13, the rotor 2 still turning in the same direction as above, that is to say in the clockwise direction, and for instance at the same speed. It will be readily understood that the working of the pump is reversed, so that the liquid flows from chamber 4 into chamber 3. Liquid is now fed from tank B to tank A. When this takes place, piston 27 is moved, together with lever 12, from the position shown by Fig. 1, in which it is located closed to the left end of piston 26, to the opposite position, in which said piston is close to the right end of said cylinder. As said last mentioned end of cylinder 26 is connected through pipe 31 with chamber 3 (which is now the discharge chamber) the pressure relief means can work in the same manner as above described.

Once the lever is applied against one of its abutments, 14 or 15, it is possible, by turning crank 25, to compress more or less the spring, 17 or 18, through which the lever is applied against its abutment. According as this spring is more or less compressed, the relief device 26—27 is more or less sensitive to an increase of the discharge pressure.

Of course, although I have disclosed a specific type of pump by way of example, it is clear that the system according to the invention applies to all pumps, and especially rotary pumps, the working of which depends upon the relative position of a member such as pin 7 of the above example.

In the embodiment of Fig. 3, the rotor 2 is driven, through any suitable means, by the engine of the vehicle, in a continuous manner. The general structure of the pumping device is similar to that above described, the same reference characters designating the same parts.

In this case, chamber 3 communicates through a pipe 11 with a tank T.

On the other hand, chamber 4 communicates through a pipe 10 with a cylinder 43 inside which a piston 42 is movable. The rod 45 of this piston is pivoted to a lever 44 adapted to control the clutch 41 inserted between the gear box 40 and the engine.

A rod 29 is pivoted at one end to lever 12 and it has its opposite end fixed to a membrane 37 forming a partition in a box 35 the left hand compartment of which is connected through a pipe 38 with the suction of the vehicle engine.

The rod 28 of piston 27 carries a finger 32 fixed at right angles thereto and adapted to cooperate with a finger 33 similarly carried by rod 29.

The system above described works in the following manner:

Supposing the parts to be in the relative positions shown by the drawing, the rotor of the pump turning in a clockwise direction causes liquid to flow from chamber 3 to chamber 4, thus moving piston 42 toward the left and acting, through rod 45 and lever 44, to apply the cooperating parts of the clutch against one another. Once this result has been obtained, the pressure keeps increasing in the chamber 4 of the pump. This pressure is transmitted through pipe 31 to the right hand end of cylinder 26 and it pushes piston 27 toward the left. Through cooperating fingers 32 and 33, this movement is transmitted to rod 29, which causes lever 12 to turn toward the left, thus reducing the flow through the pump and finally bringing pin 7 at or near its concentric position, where it merely keeps the piston 42 applied toward the left, without increasing the pressure in chamber 4.

If lever 12 is turned toward the left beyond its vertical position so that pin 7 is now on the left hand side of the axis of the pump body, the working of the pump is reversed, liquid flowing from chamber 4 to chamber 3, and through piston 42, rod 45 and lever 44, the clutch is disengaged.

When the speed of the engine drops, the suction in manifold 39 increases. This suction is transmitted through pipe 38 to chamber 35 and the movable partition 37 in said chamber is drawn toward the left, thus actuating rod 29 also toward the left. As normally lever 12 is in, or close to, its vertical position, this movement of rod 29 (resulting from a drop of the engine speed) is sufficient to move said lever toward the left beyond said vertical position, thus causing the working of the pump to be reversed, which produces the disengagement of the clutch.

Therefore, with my device, a drop of the speed of revolution of the engine automatically produces the disengagement of the clutch, and the driver can change the gear combination without having to bother about the operation of the clutch.

As soon as the engine again turns more rapidly, the suction in 39 decreases, rod 29 is allowed to move toward the right and springs 17 and 18 bring back lever 12 into its original position.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. A hydraulic control system which comprises, in combination, two passages for a liquid, a liquid pumping device including a pump, inserted in series between these two passages, adapted to be driven always in the same direction, and means movable between two extreme positions, capable of reversing the direction of flow of the liquid through said pump, for determining the rate of said flow within two given limits corresponding respectively to these extreme positions and consequently to opposed directions of said flow through the pump, manually adjustable means for yieldingly applying said movable means in at least one of said two extreme positions, and distinct means operative by the difference, either in one direction or the other, between the respective liquid pressures in said passages, for automatically controlling the position of said movable means.

2. A hydraulic control system which comprises, in combination, two liquid passages, a pump body inserted in series between said passages, a part rotatable with respect to said body always in the same direction, a member movably positioned with respect to said body, mechanical means, connected to said member and operative by said part, for causing liquid to flow through said pump body and said passages, either in one direction or in the other and at a variable rate according to the position of said member with respect to said body, two abutments for said member for limiting the movement thereof with respect to said body to two extreme positions corresponding respectively to opposed directions of flow of the liquid through said pump, manually adjustable means for yieldingly applying said member against at least one of said two abutments, and distinct means operative by the difference, either in one direction or the other, between the respective liquid pressures in said passages, for automatically controlling the position of said member.

3. A hydraulic control system which comprises, in combination, two passages for a liquid, a cylindrical pump body inserted in series between said passages, a rotor in said body adapted to be driven always in the same direction, a member movable with respect to said body transversely thereto, mechanical means, connected to said member and operative by said rotor, for causing liquid to flow through said pump body and said passages, either in one direction or in the other and at a variable rate according to the position of said member with respect to said body, two abutments for said member for limiting the displacement thereof with respect to said body to two extreme positions, corresponding respectively to opposed directions of flow of the liquid through said pump, manually adjustable spring means for yieldingly applying said member against at least one of said two abutments, a cylinder mounted in fixed position with respect to said body, a piston in said cylinder having its faces subjected to the respective liquid pressures in said passages, and means operative by said piston for controlling the position of said member with respect to said pump body.

4. A hydraulic control system comprising a conduit, a pump interposed in said conduit driven at all times in one direction, reversing means associated with said pump for reversing the pumping action thereof, controlling means for said reversing means, means for manually adjusting said controlling means and means responsive to the pressure difference at the inlet and outlet of said pump modifying the action of said controlling means.

5. A hydraulic control system comprising a conduit, a pump interposed in said conduit driven at all times in one direction, reversing means associated with said pump for reversing the pumping action thereof, controlling means for said reversing means, means for manually adjusting said controlling means and means responsive to the pressure difference at the inlet and outlet of said pump controlling the action of said controlling means.

6. A hydraulic control system comprising a conduit, a pump interposed in said conduit driven at all times in one direction, reversing means associated with said pump for reversing the pumping action thereof, controlling means for said reversing means, means for manually adjusting said controlling means and pressure responsive means controlling said controlling means.

MAURICE PARTIOT.